United States Patent
Martinez et al.

(10) Patent No.: US 6,901,557 B1
(45) Date of Patent: May 31, 2005

(54) STATE/ACTIVITY INDICATION USING ICONS ON AN LCD

(75) Inventors: Jesus A. Martinez, Portland, OR (US); Manoj B. Agnihotri, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 09/513,425

(22) Filed: Feb. 25, 2000

(51) Int. Cl.[7] .................................................. G06F 9/00
(52) U.S. Cl. ...................... 715/772; 715/846
(58) Field of Search .............................. 713/2; 714/36; 345/771, 772, 864, 970, 736; 715/846

(56) References Cited

U.S. PATENT DOCUMENTS

| | | | | |
|---|---|---|---|---|
| 5,274,815 A | * | 12/1993 | Trissel et al. ............... | 712/226 |
| 5,442,740 A | * | 8/1995 | Parikh ......................... | 345/440 |
| 5,455,904 A | * | 10/1995 | Bouchet et al. ............. | 345/798 |
| 5,617,526 A | * | 4/1997 | Oran et al. .................. | 345/779 |
| 5,809,449 A | * | 9/1998 | Harper ......................... | 702/63 |
| 5,903,269 A | * | 5/1999 | Poreh et al. ................. | 345/804 |
| 5,953,010 A | * | 9/1999 | Kampe et al. ............... | 345/772 |
| 5,956,507 A | * | 9/1999 | Shearer et al. .............. | 709/104 |
| 5,958,058 A | * | 9/1999 | Barrus ......................... | 713/320 |
| 6,014,141 A | * | 1/2000 | Klein ........................... | 345/835 |
| 6,121,967 A | * | 9/2000 | Foster et al. ................ | 345/772 |
| 6,122,746 A | * | 9/2000 | Nouri et al. ................. | 713/310 |

OTHER PUBLICATIONS

DU Meter 2.1. Mecklermedia Corporation. 1998. http://cwsapps.txcyber.com/32diag–dumeter.html.*
2x2mas InfoBar 1.1. CNET Download.com. Jan. 24, 2000. http://download.com/3000–2343–1530251.html?tag=lst–0–1.*
Review: Norton Utilities 3.5. Michael Tsai. 1997. http://www.atpm.com/3.11/page11.shtml?print.*
MacNow Review Norton Utilities, Version 4.0. Sharon Hart. 1998. http://www.macnow.com/issues/1998/12/reviews/nutil.html.*

* cited by examiner

Primary Examiner—John Cabeca
Assistant Examiner—Brian Detwiler
(74) Attorney, Agent, or Firm—Trop, Pruner & Hu, P.C.

(57) ABSTRACT

An LCD display provides language-independent icons for identifying state and/or activity information about a processor-based system. The LCD display includes a distinct portion for connoting different functional aspects of the system. Icons identifying the power-on state, disk activity, LAN activity, WAN activity, and sensor conditions are supplied.

13 Claims, 8 Drawing Sheets

STATE ICON 310:

FIGURE 3A

DISK ACTIVITY ICON 312:

FIGURE 3B

LAN ACTIVITY ICON 314:

FIGURE 3C

WAN ACTIVITY ICON 316:

FIGURE 3D

SENSOR STATUS ICON 318:

FIGURE 3E

"PLEASE WAIT" ICON 320:

STATE/ACTIVITY INDICATION USING ICONS ON AN LCD

BACKGROUND

This invention relates to server systems and, more particularly, to successful initialization of servers.

A headless server is a server system which includes no keyboard, no mouse and no monitor. As expected, headless server systems typically operate without any human intervention. Because of this, headless server systems have higher reliability requirements than most other computer systems. Further, headless server systems ideally operate using minimal or no manual steps.

For a typical computer system, the "boot" process is executed by a program, usually located in read-only memory (ROM) of the computer system. The ROM program may be described as including two separate processes: the power-on self test, or POST, and the basic input/output system, or BIOS. The POST part of the program executes commands such that different circuitry and components of the computer system may be initialized. The BIOS portion includes functions which may be used by software, including POST, for communicating with different devices in the computer system.

Upon receiving power to the computer system, the POST program in the ROM immediately begins execution. The POST performs initialization functions, such as detecting and testing the memory, the display, the non-volatile media, such as hard disk and floppy disk drives, and so on. In some systems, an abbreviated POST, or "quick-boot," may be available.

Once the POST routine completes initialization and testing of the system, control is typically transferred to an operating system, usually located on the hard disk drive. Once the operating system gains control of the system, all runtime operations of the system, including any execution of application programs, are controlled by the operating system. The operating system may or may not utilize the BIOS functions in communicating with the hardware of the computer system.

Currently, boot processes are designed for systems with a monitor, a keyboard and a mouse. These processes assume that the user is present in front of the system, and may thus be available to respond to any POST or operating system errors. These errors may take the form of beeps, screen displays, or other indicia. Typically, execution of either the POST or operating system program will stop once these errors occur. Manual intervention is generally the only way for the boot process to proceed. Contingencies, such as automatic attempts to boot from other devices, are typically not executed by the POST or operating system programs. Further, information is typically not shared between the operating system and the POST routine.

Thus, there is a continuing need for a reliable and automated initialization process which may be assisted remotely.

DETAILED DESCRIPTION

Figure 1:
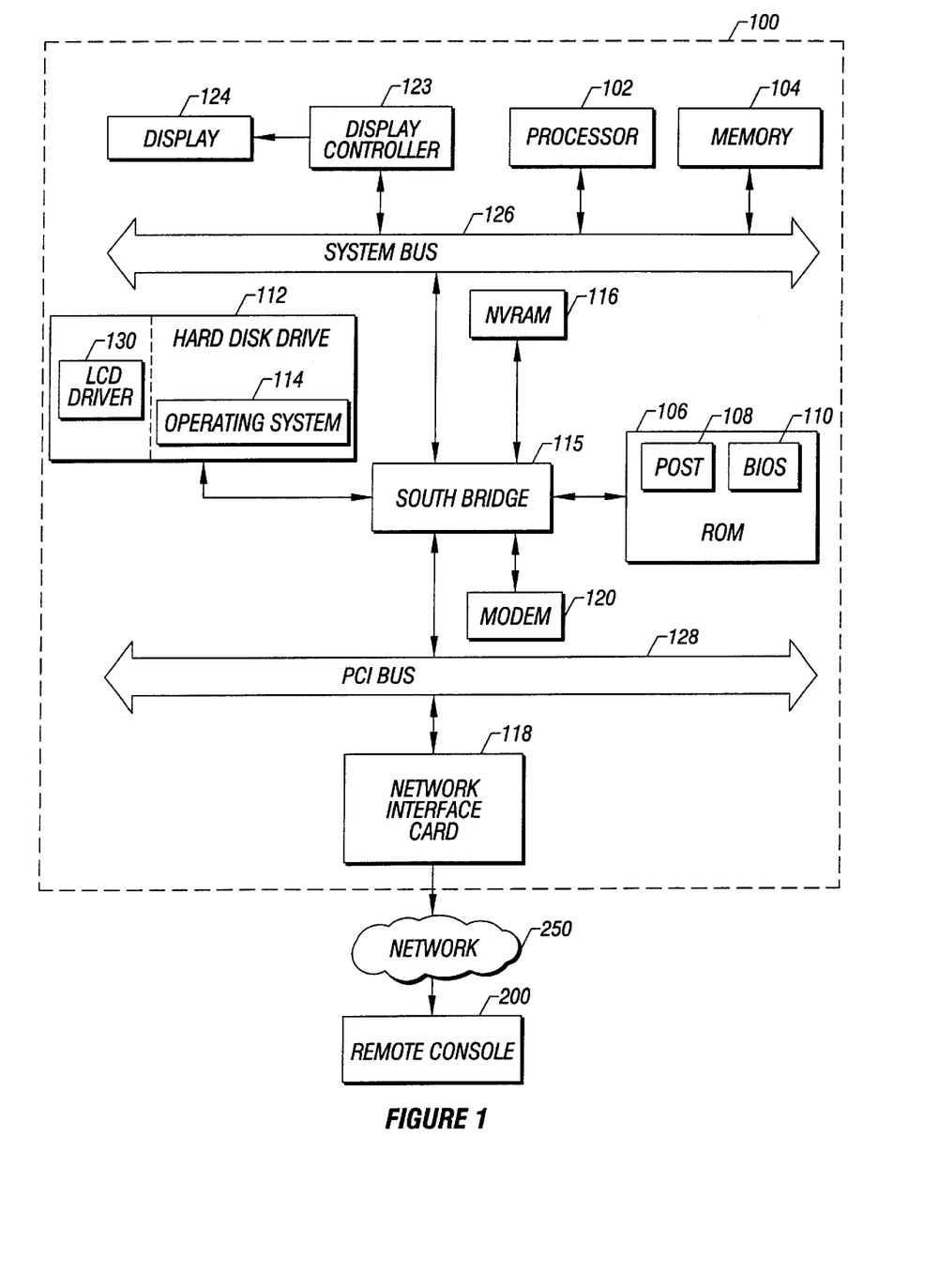
FIG. 1 is a block diagram of the system according to one embodiment of the invention.

In FIG. 1, a computer system 100 includes a processor 102 and a memory 104, connected by a system bus 126. The processor 102 may generally refer to one or more central processing units (CPUs), microcontrollers or microprocessors, such as an X86 microprocessor, a Pentium® microprocessor or an advanced risk controller (ARM), as just a few examples.

Furthermore, the phrase "computer system" may refer to any type of processor-based system that may include a desktop computer, a laptop computer, a headless server, an appliance or a set-top box, as just a few examples. Thus, the invention is not intended to be limited to the illustrated system 100, but rather, the system 100 is an example of one of many embodiments of the invention.

The memory 104 may be one of a number of types of random access memories, such as dynamic random access memories (DRAMs), synchronous DRAMs (SDRAMs), and static RAMs (SRAMs). Other types of memory 104 may include single in-line memory modules (SIMMs) or double in-line memory modules (DIMMs).

The computer system 100 further includes a South Bridge 115, between the system bus 126 and a second bus 128. The South Bridge 115 is an input/output (I/O) controller which includes bridge support between the buses 126 and 128, as well as providing an interface to a hard disk drive 112, a modem 120, non-volatile read-only memory (NVRAM) 116, and read-only memory (ROM) 106.

In one embodiment, the bus 128 is a Peripheral Component Interconnect (PCI) bus 128. The PCI bus is compliant with the PCI Local Bus Specification, Revision 2.2 (Jun. 8, 1998, available from the PCI Special Interest Group, Portland, Oreg. 97214).

Among other circuitry not shown, the PCI bus 128 may support a network interface card 118, for high-speed connection of the computer system 100 to a network 250, such as a local area network (LAN) or a wide-area network (WAN). Alternatively, connection to the computer network 250 may employ the modem 120. In one embodiment, the modem 120 is a high-speed PCI modem, connected directly to the PCI bus 128.

Also connected to the network 250 is a computer system 200. In one embodiment, the computer system 200 acts as a remote console 200 to the computer system 100. The computer system 200 may perform remote operations which assist in the successful boot of the computer system 100.

Looking back to the computer system 100, in one embodiment, the ROM 106 includes a power-on self test (POST) 108 program, and a basic input/output system (BIOS) 110 program. Alternatively, the POST 108 and BIOS 110 programs may reside in a flash memory device. The ROM 106 may also include non-volatile memory devices such as erasable and programmable read-only memories (EPROMs), electrically erasable and programmable read-only memories (EEPROMs), and flash memories.

In one embodiment, the hard disk drive 112 may store an operating system 114. The operating system 114 may be loaded into the memory 104, for faster execution.

For a headless server computer system, a monitor may not be present. However, in some embodiments, the headless server may include a small display, such as a small liquid crystal display (LCD), for error reporting. Accordingly, the system bus 126 of FIG. 1 is coupled to a display controller 123, to support a display 124, such as an LCD display.

Despite configuring the computer system 100 such that remote assistance is available, the LCD display 124 may provide additional support for some failsafe conditions. For example, the LCD display 124 may provide quick system status of the computer system 100. During initial power on, network access or other connection of the computer system 100 may not yet be established.

Further, as the computer system 100 is being powered down, connection to the remote computer system 200 may have been removed. Where network problems occur, the remote system 200 may also be unavailable. Where tasks need to be performed on the computer system 100 itself, such as removing or replacing devices on the system, the LCD display 124 may provide relevant information.

Figure 2:
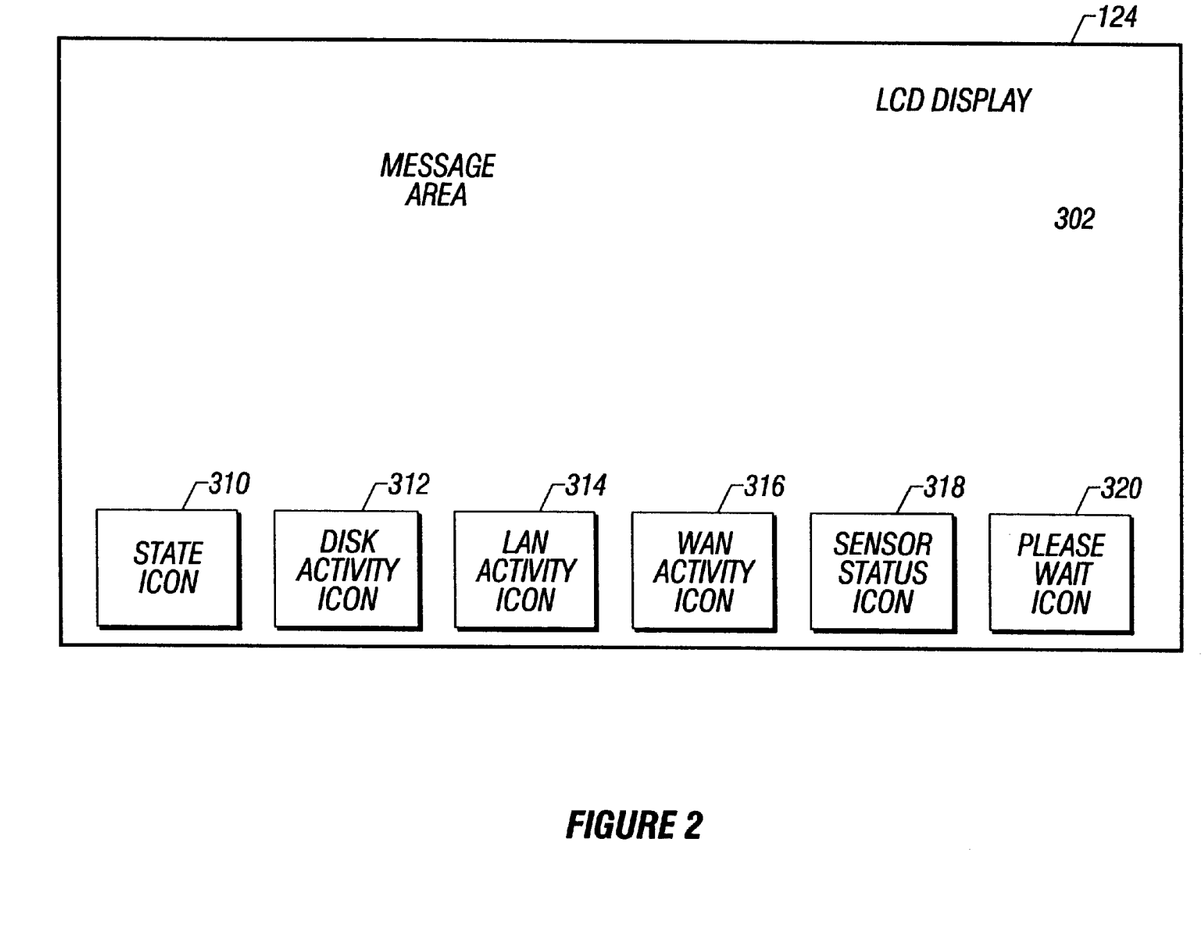
FIG. 2 is a block diagram of the LCD display 124, according to one embodiment of the invention.

In FIG. 2, the LCD display, according to one embodiment, includes a message area 302, such as for providing text-based error or status messages, and six icon regions 310–320. Along with the message area 302, the icon regions 310–320 may supply a user with relevant error and status information about the computer system 100. In one embodiment, the icon regions 310–320 are language-independent graphic elements.

In one embodiment, each icon provides status information for a distinct functional area of the computer system 100. For example, a state icon 310 indicates where in the power-on, or "boot" process, the computer system 100 is currently executing. The boot process involves execution of the POST program 108, loading the operating system 114, and successful booting of the operating system 114 such that application programs may operate. During this time, it may be difficult to identify where in the boot process the computer system 100 may be. Accordingly, the state icon 310 may supply this information about the computer system 100.

Figure 3A:
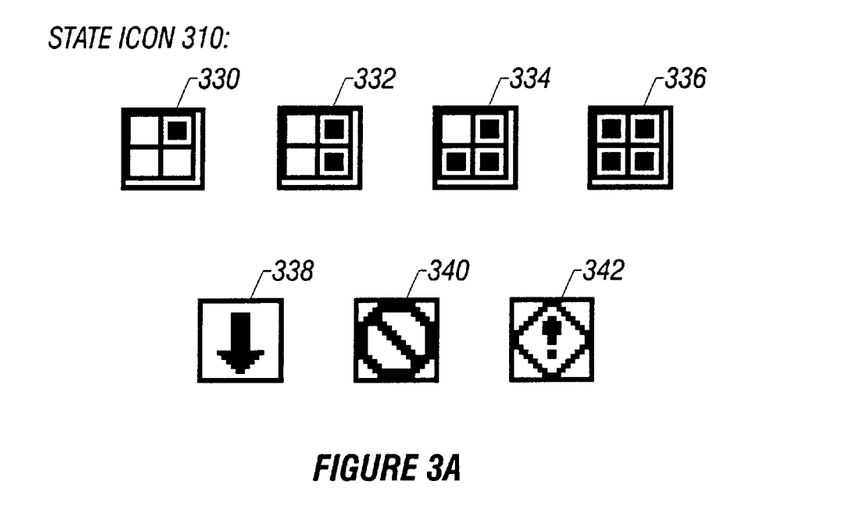
FIGS. 3A through 3F are sample icons according to one embodiment of the invention.

In Table 1, according to one embodiment, are seven different icons that may be sent to the state icon region 310. Each icon represents a distinct initialization state of the computer system 100. In FIG. 3A, icons 330–342 may be used to depict distinct initialization status. The icons may be displayed by the POST program 108 or by the operating system software 114, as described further in FIG. 4, below.

TABLE 1

State Icons

| State | Icon | Description |
| --- | --- | --- |
| POST | display icon 330 | Machine is in POST. BIOS is in control |
| OS Booting | display icon 332 | Bootstrap about to be loaded by BIOS |
| OS Initializing | display icon 334 | OS booted and started running |
| OS Running | display icon 336 | OS fully up |
| OS Shutting Down | display icon 338 | OS starting graceful shut down |
| OS Halted | display icon 340 | OS mostly shutdown |
| Emergency Mode | display icon 342 | System is in emergency mode. BIOS is in control |

A disk activity icon 312 provides status information about the hard disk drive or drives 112. In one embodiment, the disk activity icon 312 region may be updated during disk accesses, to connote a disk error, to indicate that the disk 112 is being checked, or to indicate that the disk 112 is being rebuilt from a mirror disk or other backup media.

Table 2, according to one embodiment, shows how the disk activity icon 312 may be updated in response to four states of the hard disk drive 112: normal (disk) activity, disk error, disk being checked, and disk being rebuilt. Likewise, FIG. 3B includes icons 344–350, which may be used as disk activity icons 312.

Figure 3B:
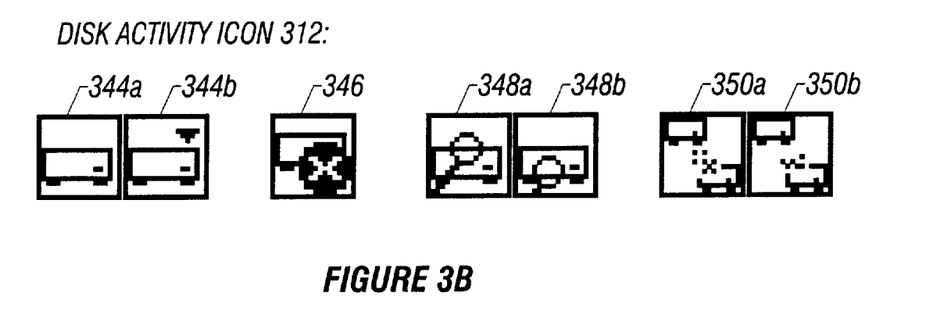

For three of the states in Table 2, two icons are shown. Where two icons are shown, the display 124 is updated with alternating icons, to provide an "animated" icon 312. Thus, for example, when disk activity occurs, icon 344a is displayed, followed by icon 344b, followed by icon 344a again, and so on. This creates the animated effect of an arrow flashing above a disk drive.

TABLE 2

Disk Activity Icons

| State | Icon | Description |
| --- | --- | --- |
| Normal Operation | alternate icons 344a and 344b | Flickered to show normal disk activity |
| Disk Error | display icon 346 | Shown to depict a disk error |
| Check disk | alternate icons 348a and 348b | Flickered to depict that disk is being checked |
| Rebuilding mirror | alternate icons 350a and 350b | Flickered to depict that the mirror is being rebuilt from a mirror or from another backup media |

Looking back at FIG. 2, a LAN activity icon 314 provides information relevant to the LAN connection of the computer system 100 to the network 250. In one embodiment, the LAN activity icon 314 indicates when LAN activity is taking place, as well as when a LAN error occurs.

Figure 3C:
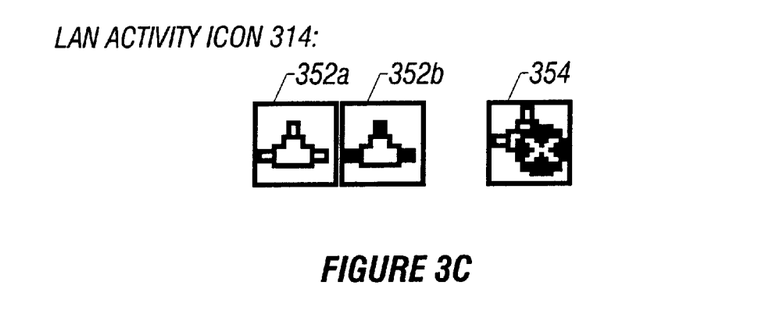

Table 3 and FIG. 3C, according to one embodiment, show how the LAN activity icon 314 may be updated with flashing icon pairs 352a and 352b for normal operation and a distinct error icon 354, to indicate a LAN error.

TABLE 3

LAN Activity Icons

| State | Icon | Description |
| --- | --- | --- |
| Normal Operation | alternate icons 352a and 352b | Flickered to show normal LAN activity |
| LAN Error | display icon 354 | Shown to depict a LAN error |

In FIG. 2, a wide-area network, or WAN, activity icon 316 also provides network-related information about the computer system 100, such as for connection to the Internet. Table 4 and FIG. 3D, according to one embodiment, show how the WAN activity icon 316 may be updated with flashing icon pairs 356a and 356b, for normal operation, while a distinct error icon 358 indicates a WAN error.

TABLE 4

WAN Activity Icons

Figure 3D:
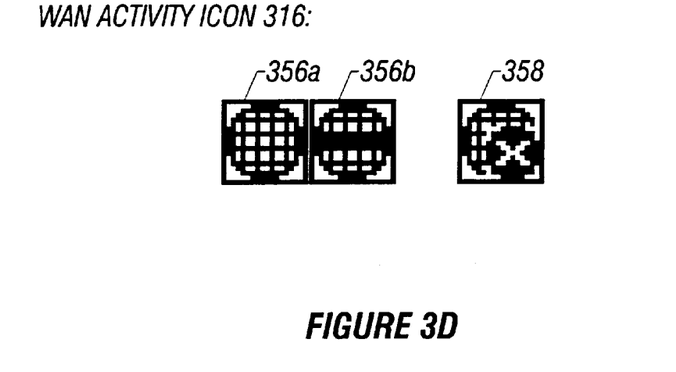

| State | Icon | Description |
| --- | --- | --- |
| Normal Operation | alternate icons 356a and 356b | Flickered to show normal WAN activity |
| WAN Error | display icon 358 | Shown to depict a WAN error |

A sensor status icon 318 may be used to depict sensor conditions for the computer system 100. In one embodiment, the computer system 100 may include sensors for monitoring the voltage, the temperature, the operation of a fan, whether the chassis is opened, and other physical characteristics of the computer system 100. Some possible sensor status icons 318, according to one embodiment, are shown in Table 5 and FIG. 3E.

TABLE 5

Sensor Status (Health) Icons

Figure 3E:
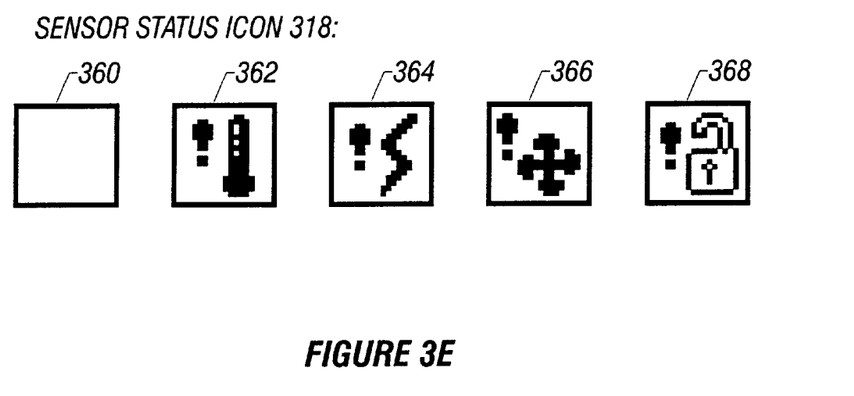

| State | Icon | Description |
| --- | --- | --- |
| Normal Operation | display icon 360 | All sensors are OK |
| Temperature Alert | display icon 362 | A temperature sensor has generated an alert |
| Voltage Alert | display icon 364 | A voltage sensor has generated an alert |
| Fan Alert | display icon 366 | A fan sensor has generated an alert |
| Intrusion Alert | display icon 368 | The chassis has been opened |

A "please wait" icon 320 is also provided, in some embodiments. The "please wait" icon 320 may be used by the POST program 108, the operating system software 114, or other applications to indicate that a process is ongoing, but not yet complete. For example, when a program is loaded, the "please wait" icon 320 may be sent to the LCD display 124. Table 6 shows the "please wait" icon according to one embodiment.

TABLE 6

"Please Wait" Icon

| State | Icon | Description |
| --- | --- | --- |
| Normal Operation | display icon 360 | System is running normally |
| Please wait | display icon 370 | Shown when a time consuming or critical operation is taking place |

Looking back to FIG. 1, in some embodiments, the computer system 100 includes an LCD driver 130 for sending configuration, status, and error information to the display 124. The LCD driver 130 may provide text information for the message area 302 or may update one of the icons 310–320. The LCD driver 130 is loaded by the operating system 114 once the computer system 100 is initialized.

Particularly during early initialization of the computer system 100, however, the LCD driver 130 may not be available for sending information to the display 124. For the time prior to successfully loading the operating system 114, for example, the LCD display driver 130 may not be used. Instead, in one embodiment, the computer system 100 includes a function, display icon, in the BIOS 110 for updating the icons. The BIOS functions 110 may be used by the POST program 108, the operating system program 114, or application programs, as needed.

Figure 4A:
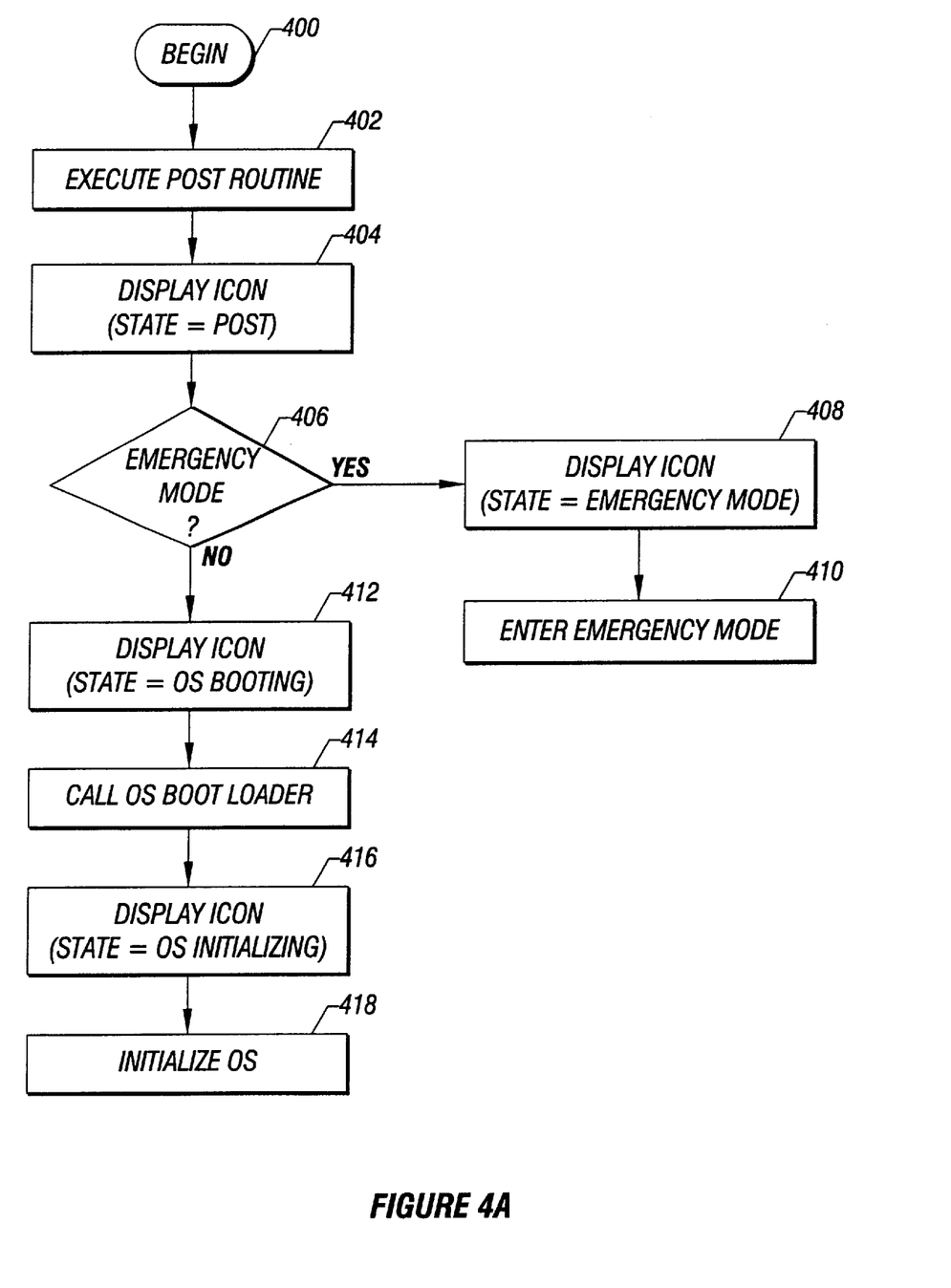
FIGS. 4A and 4B are flow diagrams for updating the state icon according to one embodiment of the invention.
Figure 4B:
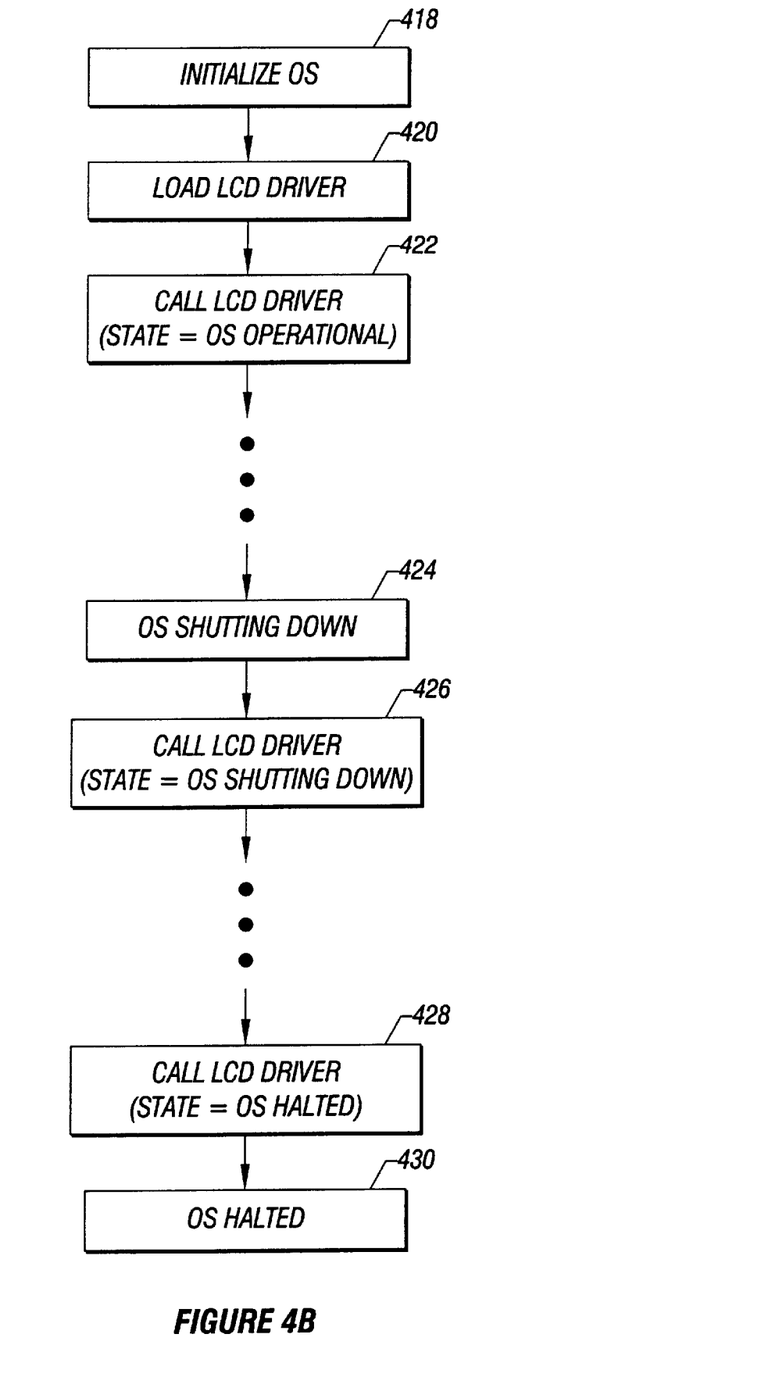

In FIGS. 4A and 4B, the computer system 100 may update the state icon 310 according to the flow diagrams. The state icon 310 is updated at different points during the boot of the computer system 100. First, the POST program 108 is executed (block 402) and the state icon 310 is accordingly updated (block 404). In the embodiment of FIG. 3A, the state icon 310 would be updated with the icon 330. Because the operating system 114 is not yet loaded, the BIOS function, display icon, is used to update the state icon 310.

If the system is in an emergency mode (block 406), the display icon BIOS function is again used, this time to update the state icon 310 to indicate that the system is in an emergency mode. In the embodiment of FIG. 3A, icon 342 is used. The computer system 100 next enters the emergency mode (block 410).

If the system is not in an emergency mode, the state icon 310 is updated to indicate that the operating system is booting (block 412). Again, the display icon BIOS function is used. Then, the operating system 114 boot loader is called (block 414).

Just before initialization, the state icon 310 is once again updated, to show that the operating system 114 is initializing (block 416). In the embodiment of FIG. 3A, the icon 334 is used. Next, the operating system 114 is initialized (block 418).

In FIG. 4B, the operating system 114 now has been initialized such that the LCD driver 130 may be loaded (block 420). This time, to update the state icon 310, the LCD driver 130 is called, to indicate that the operating system 114 is now operational (block 422). In the embodiment of FIG. 3A, the icon 336 indicates this state.

At some point, the operating system 114 may be shut down (block 424). The LCD driver 130 is called, to indicate this new state (block 426). In the embodiment of FIG. 3A, the icon 338 indicates that the operating system 114 is shutting down.

Following shut down of the operating system 114, the operating system 114 may be halted. Accordingly, the LCD driver 130 is called (block 428). In the embodiment of FIG. 3A, the icon 340 indicates that the operating system 114 is halted. Following the update of the state icon 310, the operating system 114 is halted (block 430).

The disk activity icons 312 may also be updated using the LCD driver 130. In one embodiment, the operating system 114 controls the disk activity icon 312 using a disk activity driver. The disk activity driver acts as a filter between a file system driver and a disk driver, such as used to control the hard disk drive 112.

Figure 5:
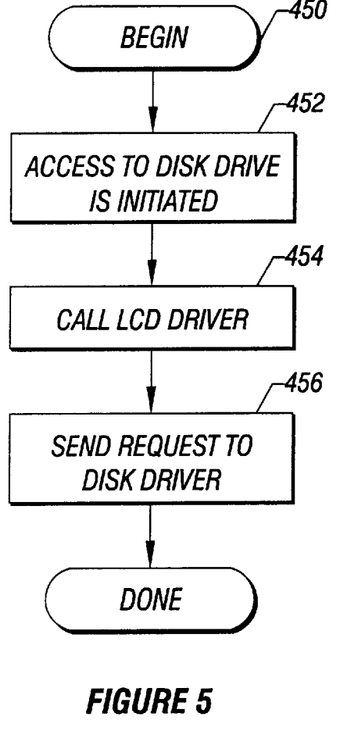
FIG. 5 is a flow diagram of the disk activity driver according to one embodiment of the invention.

In FIG. 5, a flow diagram illustrates the operation of the disk activity driver, according to one embodiment. First, access to the disk driver is initiated (block 452), such as by a file system driver. The disk activity driver then calls the LCD driver 130, to update the disk activity icon 312 so that it is evident that a disk access is occurring (block 454). Following this, the disk activity driver passes the initial request onto the disk driver (block 456). In some embodiments, the LCD driver 130 is not updated if a disk error occurs, despite detection of a disk access by the disk activity driver.

The operating system 114 may call the LCD driver 130 during other disk activities. For example, should a back up of the hard disk drive 112 occur, the operating system 114 may call the LCD driver 130 to change the disk activity icon 312.

Figure 6:
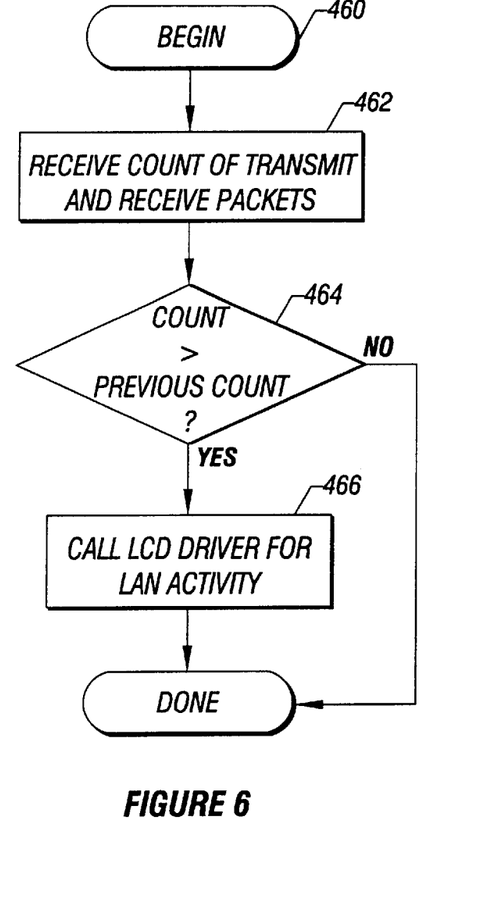
FIG. 6 is a flow diagram of the LAN activity service according to one embodiment of the invention.

To monitor LAN activity, the operating system 114, in one embodiment, periodically calls a LAN activity service. In FIG. 6, the operation of the LAN activity service, according to one embodiment, requests the number of successful sends and receives from a NIC driver using an NDIS query to retrieve the transmit and receive counters.

After receiving a count of the transmit and receive packets (block 462), the count is compared to a previous count (diamond 464). In one embodiment, if the number of transmit and receive packets exceeds the prior count, the LCD driver 130 is called, to indicate that LAN activity is occurring (block 466). If the count does not exceed the previous count, this indicates that no LAN activity is occurring, and accordingly, no update of the LAN activity icon 314 is necessary.

The operating system 114 also controls updating the WAN activity icon 316. In one embodiment, the operating system invokes a WAN activity driver, which updates the WAN activity icon 316 on the display 124. Like the disk driver, the WAN activity driver acts as a filter driver, intercepting requests intended for a modem driver.

When a requesting driver or application opens a handle and/or initiates a request to the modem driver, the WAN activity driver receives the request instead. When the request is received, the WAN activity drivers sends a request to the LCD driver 130, so that the WAN activity icon 316 may be updated to indicate WAN activity. The WAN activity driver then passes the original request to the modem driver. Further, when all connections have been closed, the WAN activity driver also removes the WAN activity icon.

Figure 7:
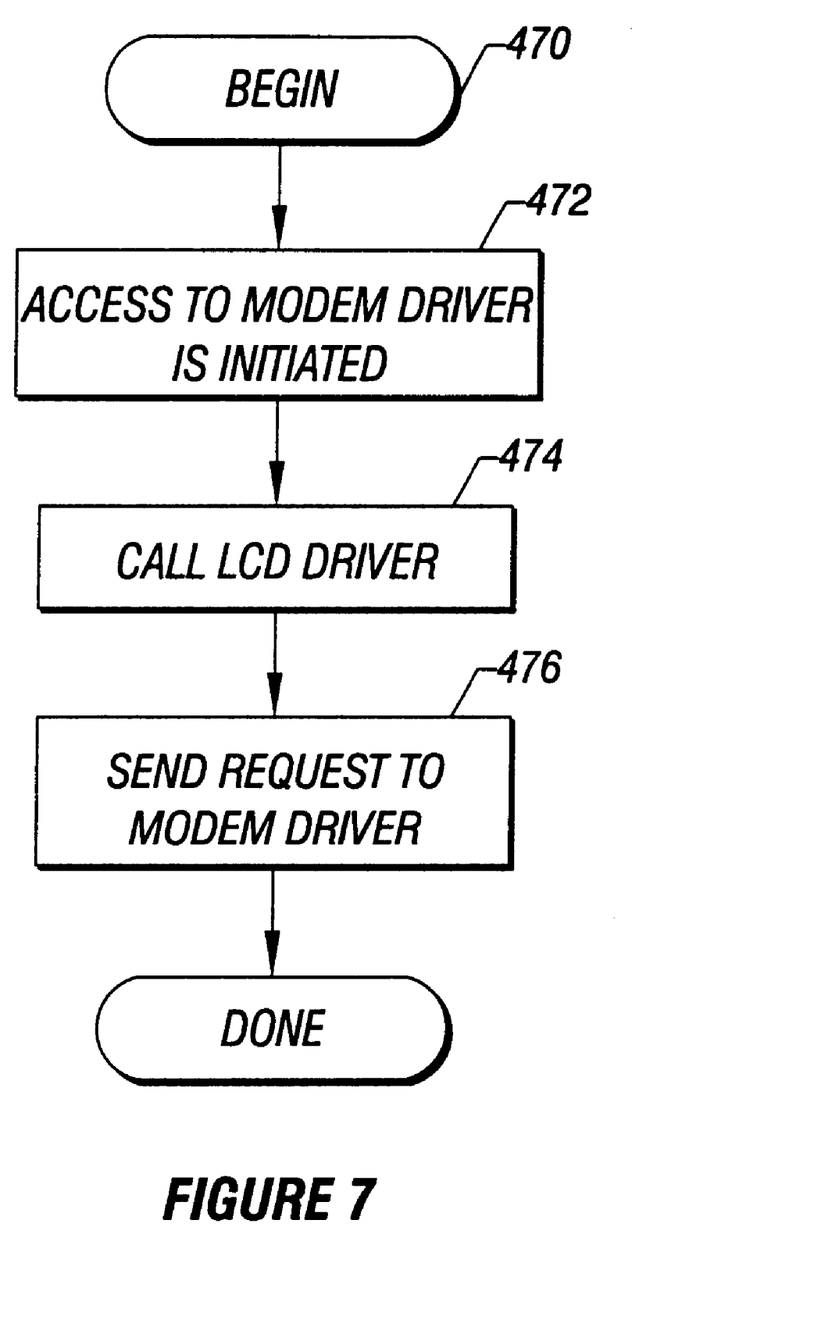
FIG. 7 is a flow diagram of the WAN activity driver according to one embodiment of the invention.

In FIG. 7, the WAN activity driver according to one embodiment is illustrated. First, access to the modem driver is initiated (block 472). The WAN activity driver then calls the LCD driver 130 (block 474). Then, the original request is passed on to the modem driver (block 476).

The sensor status icon 318 may be updated by the POST program 108, by the operating system program 114, or by other application software, such as diagnostic programs. In one embodiment, the computer system 100 includes distinct sensors for monitoring temperature, voltage, operation of the fan, and whether the chassis is opened. Accordingly, in the embodiment of FIG. 3E, a temperature icon 362, a voltage icon 364, a fan icon 366, and a chassis opened icon 368 may be placed in the sensor status icon 318 position of the LCD display 124.

Figure 3F:
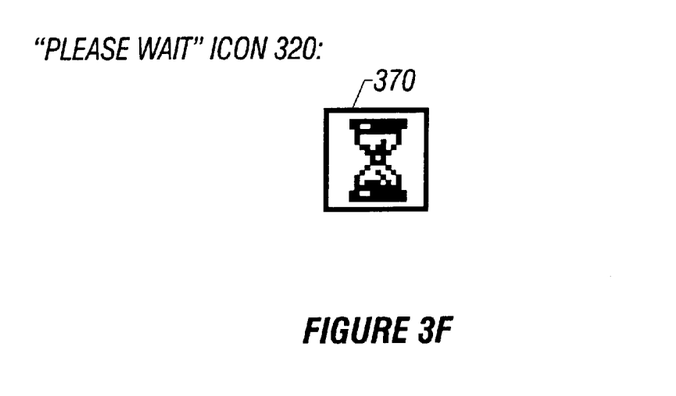

The "please wait" icon 320 may likewise be used by any power-on routine to indicate that an operation may take an extended period of time. In one embodiment, the "hourglass" icon 370 of FIG. 3F may be called by the LCD driver 130 or by the BIOS 110 function, display icon.

Thus, in some embodiments a system provides a mechanism for the power-on state as well as other activities of a system to be visibly available to a user. In some embodiments, different icons are available to represent distinct functional portions of the computer system: power-on state, LAN activity, disk activity, WAN activity, and sensor status.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:
monitoring a request for an activity of a processor-based system using an activity driver;
retrieving an icon relating to the activity from a memory;
sending the icon to a location of a display; and
sending the request to a predetermined program from the activity driver.

2. The method of claim 1, further comprising:
retrieving a second icon from the memory; and
sending the second icon to the location of the display after the first icon.

3. The method of claim 1, monitoring a request for an activity further comprising:
intercepting a disk request; and determining that a disk activity is occurring.

4. The method of claim 1, monitoring a request for an activity further comprising:
counting transmissions through a local area network by the processor-based system;
comparing the count to a prior count; and
determining that a local area network activity is occurring.

5. The method of claim 1, monitoring a request for an activity further comprising:
intercepting a modem request; and
determining that a modem activity is occurring.

6. The method of claim 1, further comprising:
using a function located in a basic input/output system program to send the icon to the location of the display.

7. The method of claim 6, further comprising using the function before an operating system is operational.

8. The method of claim 6, further comprising using the function when an operating system is in an emergency mode.

9. A system, comprising:
a processor;
a memory coupled to the processor;
a display; and
a storage medium coupled to the processor including a software program that, upon execution:
monitors a request for an activity of the system using an activity driver;
retrieves an icon relating to the activity from a memory;
sends the icon to a location of a display; and
sends the request to a predetermined program from the activity driver.

10. The system of claim 9, wherein the software program, upon execution, further:
retrieves a second icon from the memory; and
sends the second icon to the location of the display after the first icon.

11. The system of claim 9, wherein the software program, upon execution sends the icon to the location of the display using a function located in a basic input/output system program.

12. An article comprising a medium storing software that causes a processor-based system to:
monitor a request for an activity of the processor-based system using an activity driver;
retrieve an icon relating to the activity from a memory;
send the icon to a location of a display; and
send the request to a predetermined program from the activity driver.

13. The article of claim 12, further storing software that causes a processor-based system to:
retrieve a second icon from the memory; and
send the second icon to the location of the display after the first icon.

* * * * *